Figure 1:
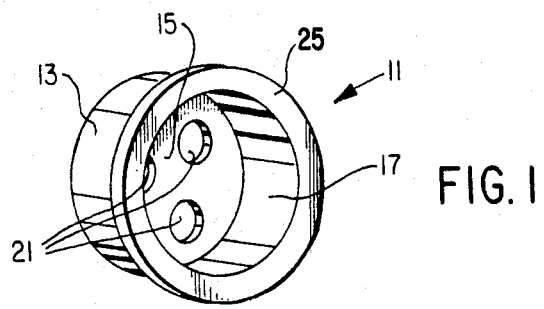

United States Patent [19]

Balkwill et al.

[11] Patent Number: 4,496,792

[45] Date of Patent: Jan. 29, 1985

[54] ELECTRICAL CONDUIT WITH VAPOR BARRIER DEVICE

[76] Inventors: G. Russell Balkwill, 2429 Howard Ave., Windsor, Ontario, Canada, N8X 3V5; Jules P. Robinet, 2865 Virginia Pk., Windsor, Ontario, Canada, N9E 2B8; John F. Tamasovics, 2530 Todd La., Windsor, Ontario, Canada, N9H 1K5

[21] Appl. No.: 466,043

[22] Filed: Feb. 14, 1983

[51] Int. Cl.³ .......................... H02G 3/04; H02G 3/18
[52] U.S. Cl. ................................ 174/65 R; 174/77 R; 174/83
[58] Field of Search ...................... 174/20, 22 R, 23 R, 174/65 R, 65 G, 68 R, 68 C, 74 A, 77 R, 82, 83, 174/93, 152 G

[56] References Cited

U.S. PATENT DOCUMENTS 2,628,264  2/1953  Esher ................................ 174/83 X
3,065,292  11/1962  Chickvary ........................ 174/93 X
3,787,606  1/1974  Schaeffer ......................... 174/83 X

FOREIGN PATENT DOCUMENTS 135299  11/1933  Austria ............................. 174/77 R
278738  2/1952  Switzerland ...................... 174/65 G
696241  8/1953  United Kingdom ........... 174/152 G
421216  3/1975  U.S.S.R. ............................... 174/93

Primary Examiner—Laramie E. Askin
Attorney, Agent, or Firm—Allen D. Gutchess, Jr.

[57] ABSTRACT

The present invention relates to a device for sealing an electrical conduit comprising a tubular portion having a closed end and an open end. The device is formed of a resilient material. The closed end is adapted to have a wire or cable sealingly received therethrough. The outer surface of the tubular portion is of a diameter such that upon insertion of the tubular portion into the conduit, the outer surface of the tubular portion sealingly engages the inner surface of the conduit.

3 Claims, 4 Drawing Figures

U.S. Patent  Jan. 29, 1985  4,496,792

ELECTRICAL CONDUIT WITH VAPOR BARRIER DEVICE

This invention relates to a "one-piece" device for sealing electrical conduits.

It is often required that electrical conduits be sealed at a particular point in order to prevent or reduce the passage of air or moisture. Typically, electrical conduits are required to be sealed at the point where they enter a building or at their ends inside the building.

It has been common to mold a putty type compound or duct seal around the wires or cables in a conduit in order to seal the conduit. This, however, is a time consuming process and its effectiveness is not always satisfactory. Many devices for sealing conduits are known in the prior art. In general, however, they do not satisfy the simultaneous requirements that they be inexpensive and quickly and easily installable. In particular, they are not easily adapted for use with different configurations and sizes of wire and many are not "one-piece" but require the use of bushings, grommets, or plugs.

According to the present invention there is provided a device for sealing an electrical conduit comprising a tubular portion having a closed end and an open end; said device being formed of a resilient material; said closed end being adapted to have a wire or cable sealingly received therethrough; the outer surface of said tubular portion being of a diameter such that upon insertion of said tubular portion into said conduit, said outer surface of said tubular portion sealingly engages the inner surface of said conduit.

Figure 2:
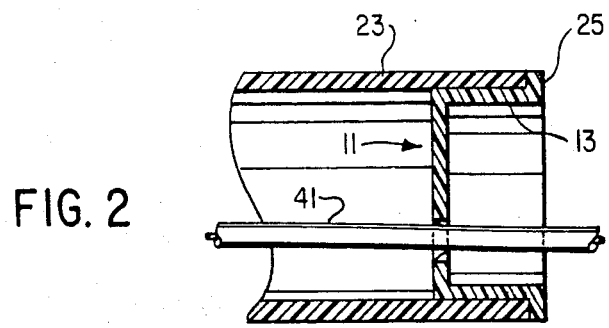
Figure 3:
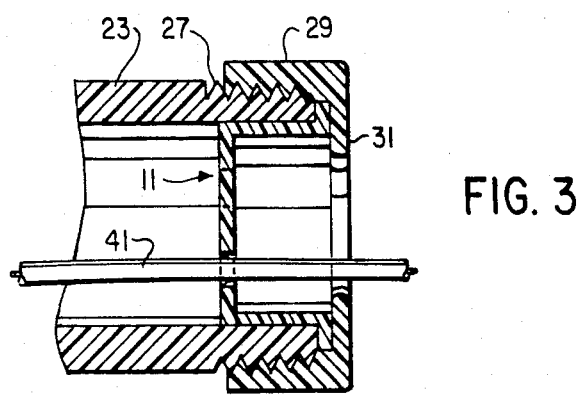
Figure 4:
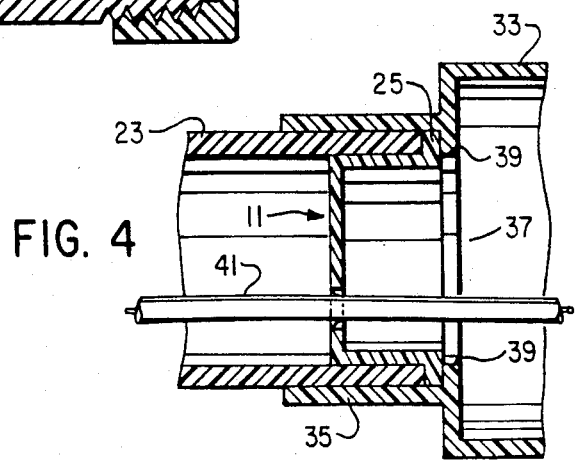

In the drawings which are illustrative of preferred embodiments of the invention, FIG. 1 is a perspective view of the sealing device according to the present invention, FIG. 2 is a sectional view showing the sealing device inserted into an electrical conduit, FIG. 3 is a sectional view showing the sealing device held in place in an electrical conduit by a threaded collar, FIG. 4 is a sectional view showing the sealing device held in place between an electrical conduit and a junction box.

Referring to FIG. 1, there is shown a sealing device 11 having a tubular portion 13, a closed end 15 and an open end 17. At the open end 17, an annular flange 25 extends outwardly from the tubular portion 13. The closed end 15 has weakened portions 21 which consist of areas of the closed end 15 having a thickness substantially less than the remainder of the closed end.

Referring to FIG. 2, the outer diameter of the tubular portion 13 is chosen so that when the device 11 is inserted into the end of the conduit 23, the outer surface of the tubular portion 13 fits tightly against the inner surface of the conduit 23.

The sealing device 11 is formed of a resilient material such as polyethylene, thereby facilitating the insertion of the device 11 into the conduit 23 and resulting in the formation of a substantially air and moisture proof barrier between the outer surface of the tubular portion 13 and the inner surface of the conduit 23.

The flange 25 provides a stop when one is inserting the device into the conduit, and when the device is fully inserted into the conduit, the flange abuts against the end edge of the conduit, thereby further improving the seal between the device 11 and the conduit 23. The flange 25 also serves as a gripping means to facilitate the insertion or removal of the device 11 from the conduit.

FIG. 3 shows the device 11 inserted into a conduit 23, which end has an exteriorly threaded portion 27. A correspondingly internally threaded collar or tubular member 29 having a flange 31 is screwed on to the threaded portion 27 of the conduit 23. The flange 31 of the collar engages the flange 25 of the device and presses it against the end edge of the conduit 23. This ensures that the device 11 is securely in place and it improves the seal formed between the flange 25 and the edge of the conduit 23.

In FIG. 4, there is shown a device 11 placed between a conduit 23 and a junction box 33. The junction box 33 has a tubular portion or member 35 which is slightly greater in its inside diameter than the outside diameter of conduit 23 and the flange 25. An opening 37 is of the same diameter as the inner diameter of the conduit 23 and, accordingly, when the conduit 23 and the device 11 are inserted into the tubular portion 35 of the junction box, the flange 25 of the device 11 is pressed between the end edge of the conduit 23 and portions 39 of the junction box.

The weakened portions 21 in the closed end 15 of the device 11 are formed of a resilient material, preferably polyethylene, and are thin enough so that they may be easily punctured by a wire or cable 41. As the wire or cable is pulled through the weakened portion 21, the edges of the hole formed by the puncture press and seal against the wire. This structure permits wires or cables of a large range of sizes to be sealingly inserted through the device without the need for any additional pieces or adapters. Further, since unpunctured weakened portions 21 are air and moisture proof, a device 11 having a plurality of weakened portions may be used without adaptation in conduits carrying different numbers of wires. For example, the sealing device shown in FIG. 1 could be used in a conduit carrying either one, two, or three wires or cables.

We claim:

1. In combination, an electrical conduit having an outer surface of predetermined diameter, an inner surface of predetermined diameter, and an annular edge extending between the inner surface and the outer surface, a device for sealing the end of said conduit comprising a tubular portion having a closed end and an open end, said closed end having a plurality of areas of a thickness substantially less than the thickness of the remainder of said closed end, said areas being adapted to be punctured by and sealingly receive wires or cables, said tubular portion having an outer surface of a diameter such that said tubular portion outer surface sealingly engages the inner surface of said conduit, said open end having a flange extending outwardly therefrom with an outer diameter not exceeding the outer diameter of said conduit, said flange abutting said annular edge of said conduit, and a tubular member received over the outer surface of said conduit and having an inwardly extending flange engaging the flange of said device and pressing said device flange against the annular edge of said conduit.

2. The combination according to claim 1, characterized by an end portion of the outer surface of said conduit being threaded and said tubular member being internally threaded and engaged with the threaded portion of said conduit.

3. The combination according to claim 1 characterized by said tubular member forming a part of a junction box and being tightly fitted on said outer surface of said conduit.

* * * * *